United States Patent Office 3,522,649

Patented Aug. 4, 1970

3,522,649

METHOD OF PRODUCING ISOLATED FIELD EFFECT TRANSISTORS EMPLOYING PYROLYTIC GRAPHITE

Hans-Joachim Teuschler, Berlin, Germany, assignor to VEB Werk fur Bauelemente der Nachrichtentechnik, Carl von Ossietzky, Ernst-Thalmann, Teltow, Germany No Drawing. Filed Apr. 25, 1969, Ser. No. 819,419

Int. Cl. H01l *11/14*

U.S. Cl. 29—571 4 Claims

ABSTRACT OF THE DISCLOSURE

An isolated field effect transistor the semiconductor layer of which is constituted of lustrous carbon doped with an oxide or carbide of an element of Group IV of the Periodic System. This layer may be prepared by pyrolyzing in the presence of an alkali-free substrate for the layer a compound the pyrolysis of which yields both the carbon and the oxide or carbide.

This invention relates to an isolated field effect transistor the semiconductor layer of which, provided with terminal contacts, is separated from a contact metal layer by an isolating layer, as well as to a method for producing the same.

Isolated field effect transistors or, briefly, "FET," are distinguished from blocking layer field effect transistors in that, due to their being parallel to the boundary layer, they form no blocking layer. The effect is a charged condition which is similar to that of a condenser. In the fabrication of such a transistor two highly doped *n*-zones are diffused into a p-doped silicon lamella. On the silicon lamella a silica layer is deposited and on the isolating layer a metal layer is vapor deposited. The metal layer has the function of a control electrode and, consequently, is called a G-pole. On the terminals of the semiconducting channel two electrodes are fastened, a ground electrode (S-pole) and a receiving electrode (D-pole). If on the G- and S-poles a positive potential is produced, in the semiconducting channel in the vicinity of the isolating layer a negative charge is formed. The magnitude of the current is controlled by the magnitude of the potential applied. FET's are, therefore, as in the case of vacuum tubes, controlled approximately wattless by an applied potential. A prerequisite is a high entry resistance for the G-pole, as high as about $10^{14}$ ohms. FET's are active elements which can serve as full substitutes for vacuum tubes.

The known FET's are based on high purity individual crystals of elemental silicon and germanium or on compounds such as gallium arsenide, cadmium sulfide, indium sulfide and the like. Their manufacture involves costly and complex application of conventional semiconductor technology and is accompanied by a high reject rate.

The object of the invention is the manufacture of a field effect transistor with a semiconductor channel from polycrystalline material, with reproducible results and according to relatively simple method and with the use of materials of a readily available degree of purity.

The object is achieved by providing a field effect transistor according to the invention in which the semiconductor layer is constituted of lustrous carbon doped with an oxide or a carbide of an element of Group IV of the Periodic System, preferably Si, Ti or Zr.

Pure, hexagonal lustrous carbon, as is conventional in the coatings of resistors formed by pyrolytic separation, in comparison with traditional semiconductor materials, the crystal systems of which are cubic, has an anisotropic behavior of electric conductivity. It is always polycrystalline. For use as an FET material it possesses, however, a specific conductivity which is too high and the desired standardization of the specific resistance is not possible. This requirement is attained according to the invention by the doping of the lustrous carbon with oxides or carbides.

The depositing of the semiconductor layer on an alkali-free substrate may be carried out pyrolytically. Thereby the conductivity of the semiconductor layer may be varied over a number of orders of magnitude by variation of the dope content and the pyrolysis temperature. The specific resistance of the semiconductor layer may be provided in accordance with the intended working resistance by varying the thickness of the layer.

The pyrolytic deposition of the semiconductor layer on the substrate may, for example, be carried out by the use of lower alkyl half esters of silicic acid in which the alkyl is of 1 to 3 carbon atoms or dimethyldiethoxy silicon. Dimethyldiethoxy silicon, for example, is quantitatively split at a pyrolysis temperature of about 900 to 960° C., according to the following equation:

$$(CH_3)_2Si(OC_2H_5)_2 \rightarrow 6C + SiO_2 + 8H_2$$

Likewise suitable is any compound of the formula $M(OR^1)_2(R^2)_2$ in which M is silicon, titanium or zirconium and $R^1$ and $R^2$ are each an alkyl preferably of 1 to 3 carbon atoms. It should be understood, however, that these particular alkyl groups do not constitue an absolute limitation with respect either to the half esters of silicic acid or the $M(OR^1)_2(R^2)_2$ compounds. The criterion for selection of the alkyl groups is that the resultant compounds have a vapor pressure sufficiently high not to make vaporization thereof unduly inconvenient or costly. Therefore, strictly speaking, it is by no means impossible to employ in the present invention compounds including alkyl groups of more than three carbon atoms; this is particularly so with respect to iso-alkyls since compounds containing iso-alkyls are of higher vapor pressure than like compounds containing normal alkyls of the same carbon atom numbers. By the use of these compounds there can also be produced according to the pyrolysis conditions complete or partial carbide doping. This has the advantage in that the temperature coefficient of the semiconductor layer can be compensated.

On the semiconductor layer the isolating layer is deposited in the known way by vapor deposition. It can, however, also be effected in a simple manner directly after the pyrolytic deposition of the semiconductor layer and in the same reaction zone by an only partial pyrolysis of the same compound, in which the pyrolysis temperature is held at a level below that at which carbon deposition occurs. The process proceeds, in the case of dimethyldiethoxy silicon, for example, according to the following equation:

$$(CH_3)_2Si(OC_2H_5)_2 \rightarrow SiO_2 + 2 \cdot CH_3 + 2 \cdot C_2H_5$$

The hydrocarbon radicals can easily be conducted out of the reaction zone; they indeed tend to polymerize but the polymerizates remain in the reaction zone in gas form. The pyrolysis temperatures for this reaction is the range of about 300 to about 500° C.

In all instances, of course, temperature necessary to achieve the desired pyrolysis will vary inversely with the magnitude of the period in which the compound is maintained at the temperature. Moreover, the pyrolysis temperature will vary from compound to compound. In each case, however, the appropriate temperature clearly is routinely determinable.

The provision of the metal layer as well as the provision of the contacts for the G-, S- and D-poles is carried out by the known techniques.

The method of the invention is not encumbered by costly and difficult to master crystal purification and growing methods. The pyrolytic technique permits the varying of the resistance of the semiconductor layer to accommodate wide ranges of operating resistance by full utilization of the varying of the specific resistance of the semiconductor layer by varying its thickness.

What I claim is:

1. A method of producing an isolated field effect transistor comprising on a substrate depositing polycrystalline lustrous carbon and, as a dope, an oxide or carbide of an element of Group IV of the Periodic System to form a semiconductor layer, forming an isolating layer on said semiconductor layer and forming a contact metal layer on the isolating layer.

2. A method according to claim 1, in which said semiconductor layer is deposited by pyrolyzing a compound of the formula $M(OR^1)_2(R^2)_2$, in which M is silicon, titanium or zirconium and $R^1$ and $R^2$ are each an alkyl or an alkyl half-ester of silicic acid in the presence of a substrate for the semiconductor layer.

3. A method according to claim 2, in which the isolating layer is deposited on the semiconductor layer by pyrolyzing said compound of the formula $M(OR^1)_2(R^2)_2$ or said alkyl half-ester of silicic acid in the presence of the substrate on which the semiconductor layer already has been deposited and at a temperature such that $MO_2$ is a pyrolysis product but carbon is not a pyrolysis product.

4. A method according to claim 2, in which said substrate is alkali-free.

References Cited

UNITED STATES PATENTS

| | | | |
|---|---|---|---|
| 3,384,792 | 5/1968 | Kazan et al. | 317—235 |
| 3,442,647 | 5/1969 | Klasens | 29—578 |
| 3,445,734 | 5/1969 | Pecoraro et al. | 29—571 |

PAUL M. COHEN, Examiner

U.S. Cl. X.R.

29—577; 317—235